Feb. 21, 1956  A. BUCHMANN  2,735,458
SELF-FEEDING SAW BLADE FOR RECIPROCATING MOTOR SAWS
Filed April 28, 1952

INVENTOR.
ALBIN BUCHMANN
BY
his agent

United States Patent Office 2,735,458
Patented Feb. 21, 1956

2,735,458

SELF-FEEDING SAW BLADE FOR RECIPROCATING MOTOR SAWS

Albin Buchmann, Soleure, Switzerland

Application April 28, 1952, Serial No. 284,809

Claims priority, application Switzerland April 27, 1951

1 Claim. (Cl. 143—133)

The present invention relates to a saw blade, and more particularly to a saw blade which is shaped in such manner that the saw teeth advance during the working stroke of the saw blade into the work piece which remains stationary during the work stroke.

The known saw blades for reciprocating motor saws are shaped in such manner that the outermost points of the cutting teeth thereof are located along a straight line parallel to the direction of the reciprocating movement of the saw blade. In order to feed the work piece to the reciprocating saw blade, the work piece is pressed transversely against the saw blade, the required pressure varying according to the texture and resistance of the material, and the condition of the saw blade, so that the feed of the work piece is frequently not uniform.

It is the object of the present invention to overcome this disadvantage, and to provide a saw blade for a reciprocating motor saw which is shaped in such manner that the work piece may be fed during the return stroke of the saw blade without any resistance.

It is a further object of the present invention to reciprocate a saw blade in a direction defining an angle with a line passing through the outermost points of the saw teeth.

It is another object of the present invention to arrange the outermost points of the saw teeth along a curve having at least one tangent defining an angle with the direction of reciprocation of the saw blade.

It is a further object of the present invention to shape a saw blade in such a manner that the force required for the feed movement is supplied by the drive means reciprocating the saw blade.

With these objects in view the present invention mainly consists in a sawing method comprising the steps of rectilinearly moving a saw from a retracted to an advanced position in a direction forming an obtuse angle with a line passing through the outermost points of the saw teeth, moving a work piece transversely to the rectilinear movement of the saw into engagement with the saw teeth at a point inside the obtuse angle and near to the apex of the same while the saw blade is in the advanced position, and moving the saw blade in an opposite direction to the retracted position so that a portion of the saw blade provided in the teeth and transversely projecting toward the work piece passes through the same.

For carrying out the method of the present invention preferably a saw is employed which comprises a longitudinally extending shank portion located about a predetermined axis and further comprises a row of cutting teeth extending from said shank portion and having the outermost points thereof transversely spaced from the extension of the shank axis for distances gradually increasing in a direction away from the shank portion.

The novel features which are considered as characteristic for the invention are set forth in particular in the appended claim. The invention itself, however, both as to its construction and its method of operation, together with additional objects and advantages thereof, will be best understood from the following description of specific embodiments when read in connection with the accompanying drawings, in which:

Figure 1:
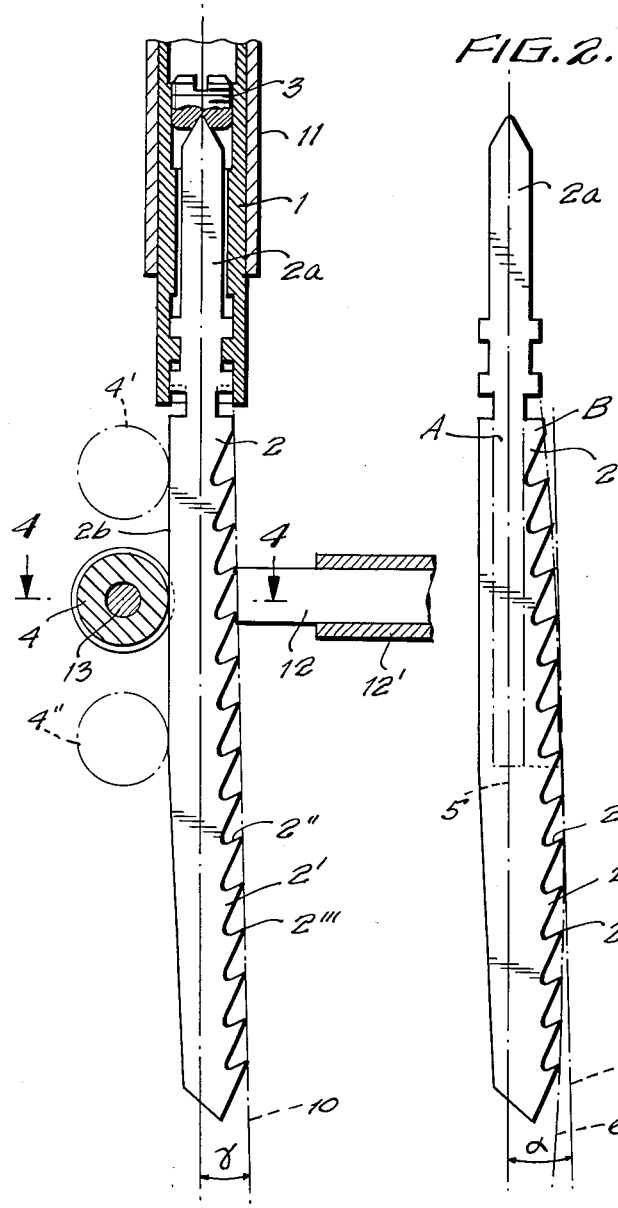
Fig. 1 is a side view of a sawing device according to the present invention.

Referring now to the drawings and particularly to Fig. 1, the shank portion 2a of a saw 2 is detachably mounted in a supporting member 1 which is slidably guided in a guiding means 11 of a sawing device, such as a reciprocating motor saw.

The supporting member 1 and thereby the saw 2 is rectilinearly reciprocated by the drive means of the motor saw (not shown). A work piece 12 is supported on supporting means 12' and may be moved transversely to the reciprocating movement of the saw into engagement with the teeth 2' of the saw.

Oppositely the work piece a roller 4 engages one edge of the saw 2 in a groove 4a, the roller 4 being mounted rotatably about a shaft 13. The positions 4', 4" indicated in broken lines in Fig. 1 illustrate schematically the positions of the roller relatively to the saw during reciprocating movement of the saw, the axis of the roller remaining actually stationary during such reciprocating movement.

The cutting teeth 2' have cutting edges 2" facing toward the end of the saw which is mounted in the supporting member 1 so that the saw is tensioned during the working stroke.

According to the present invention the points 2''' of the cutting teeth are located on a curve.

In Fig. 1 the curve is a circle having its center at infinity, or in other words a straight line, forming with the direction of reciprocation of the saw blade, or the axis of the shank portion 2a an angle $\gamma$ opening toward the free end of the saw.

Figure 2:
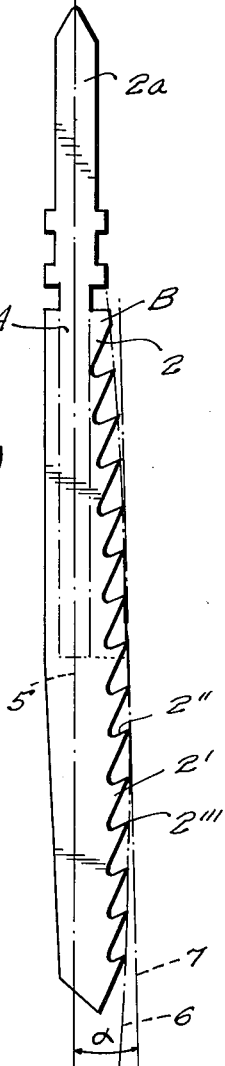
Fig. 2 is a side view of a modified embodiment of a saw according to the present invention.

In the embodiment shown in Fig. 2 the points 2''' of the cutting teeth 2' are located along a curve 6 having its concave side facing the center portion of the blade, so that a tangent 7, substantially in the middle of the curve, forms with the direction of reciprocation and the extension 5 of the axis of the shank an acute angle $\alpha$ open toward the free end of the saw.

Figure 3:
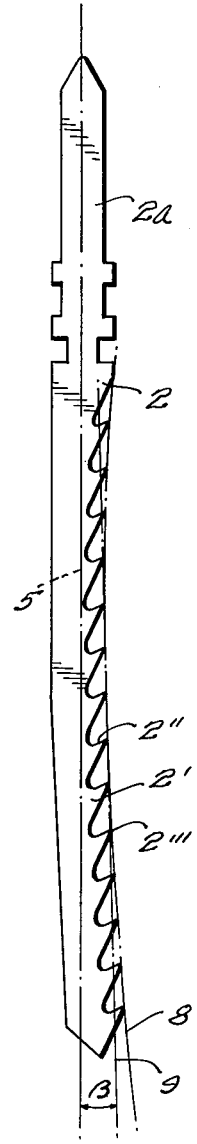
Fig. 3 is a side view of a further embodiment of a saw according to the present invention.
Figure 4:
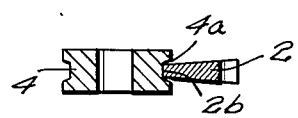
Fig. 4 is a cross-section on line 4—4 of Fig. 1.

According to a further embodiment of the present invention the points of the saw teeth may be arranged as shown in Fig. 3 on a curve having its convex side facing the center portion of the saw so that the tangent 9 on a middle portion of the curve forms with the direction of reciprocation and the axis 5 of the shank an angle $\beta$. The edge 2b of the saw extends parallel to the direction of reciprocation of the saw blade portion between the points which are engaged by the roller 4 when the saw is in advanced or retracted position during the reciprocating movement thereof, as indicated in Fig. 1 by the positions 4', 4" of the roller 4.

Structurally a saw according to the present invention comprises a central blade portion A longitudinally extending from the shank portion 2a in the middle of the blade, and a longitudinally extending edge portion B integral therewith and formed with cutting teeth, such edge portion B gradually narrowing toward the shank end of the saw.

The device operates in the following manner:

The supporting member 1 is reciprocated in the guiding means 11 so that the saw performs a rectilinear reciprocating movement. In the advanced position of the saw, corresponding to a roller position 4', the work piece is moved at the beginning of the operation into engagement with the teeth of the saw blade. When the saw blade now performs its cutting stroke the teeth gradually cut into the work piece since the teeth located nearer to the free end of the saw blade project farther toward the work piece than the teeth nearer to the shank which are engaging the workpiece at the beginning of the cutting stroke, and a slit is cut into the workpiece having the bottom thereof spaced from the central axis of the shank and of the saw for the distance of the teeth farthest spaced from said central axis. (Position 4".) Consequently, the force required for cutting into the material is supplied by the drive means reciprocating the saw. When the cutting stroke has ended, the saw moves again to an advanced position, and since the points of the teeth nearer to the shank are spaced a shorter distance from the central axis of the shank portion and of the blade, the bottom of the slit in the work piece is spaced from such points when the blade is in advanced position. The work piece is now again moved toward the saw blade so that the points of the teeth near the shank engage the bottom of the slit. When the saw blade moves again to its retracted position the bottom of the slit is deepened by the farther projecting teeth located nearer to the free end of the saw.

The supporting roller 4' abutting against the blade takes up the reaction to the pressure exerted by the blade against the workpiece, the edge engaged by the roller being parallel to the direction of reciprocation.

However, in order to avoid that the free end of the blade is unduly wide which would cause difficulties in cutting around curves having a small radius, and would lead to binding of the saw blade, the parallel portion of the edge extends only along a portion of the blade, while beyond the position 4" of the roller 4, the free end of the blade is narrowed so that the blade may be easily moved around curves having a small radius.

It will be understood that each of the elements described above, or two or more together, may also find a useful application in other types of sawing devices differing from the types described above.

While the invention has been illustrated and described as embodied in a saw blade having cutting teeth located along a line forming an angle with the direction of reciprocation of the saw blade, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

For use with a reciprocating motor saw, a saw blade having a longitudinal axis and being composed of a single shank portion located at the rear end of the blade and adapted to be attached to the motor saw, and of an integral elongated cutting portion extending from said elongated shank portion to the front end of said saw blade, said cutting portion having a guide edge adapted to engage a supporting member and extending parallel to said axis and a cutting edge inclined to said guide edge and formed along its entire length with a row of cutting teeth all of which are directed toward said elongated shank portion and have transverse cutting edges facing said elongated shank portion, the transverse distances between at least some consecutive cutting teeth of said row of cutting teeth and said guide edge gradually increasing toward the front end of said saw blade so that when said saw blade is reciprocated in direction of said longitudinal axis, said cutting teeth are urged by said supporting member to cut into material engaged by the same during rearward reciprocating strokes of said saw blade and move away from the material during the forward stroke of the saw blade so that forward strokes are made without resistance.

References Cited in the file of this patent

UNITED STATES PATENTS

| | | |
|---|---|---|
| 134,882 | Hardenbergh | Jan. 14, 1873 |
| 178,821 | Westman | June 13, 1876 |
| 1,855,371 | Ungar | Apr. 26, 1932 |
| 2,122,611 | Kirby | July 5, 1938 |
| 2,501,631 | Oschwald | Mar. 21, 1950 |

FOREIGN PATENTS

| | | |
|---|---|---|
| 3,536/98 | Great Britain | Feb. 12, 1898 |